Patented Mar. 25, 1930

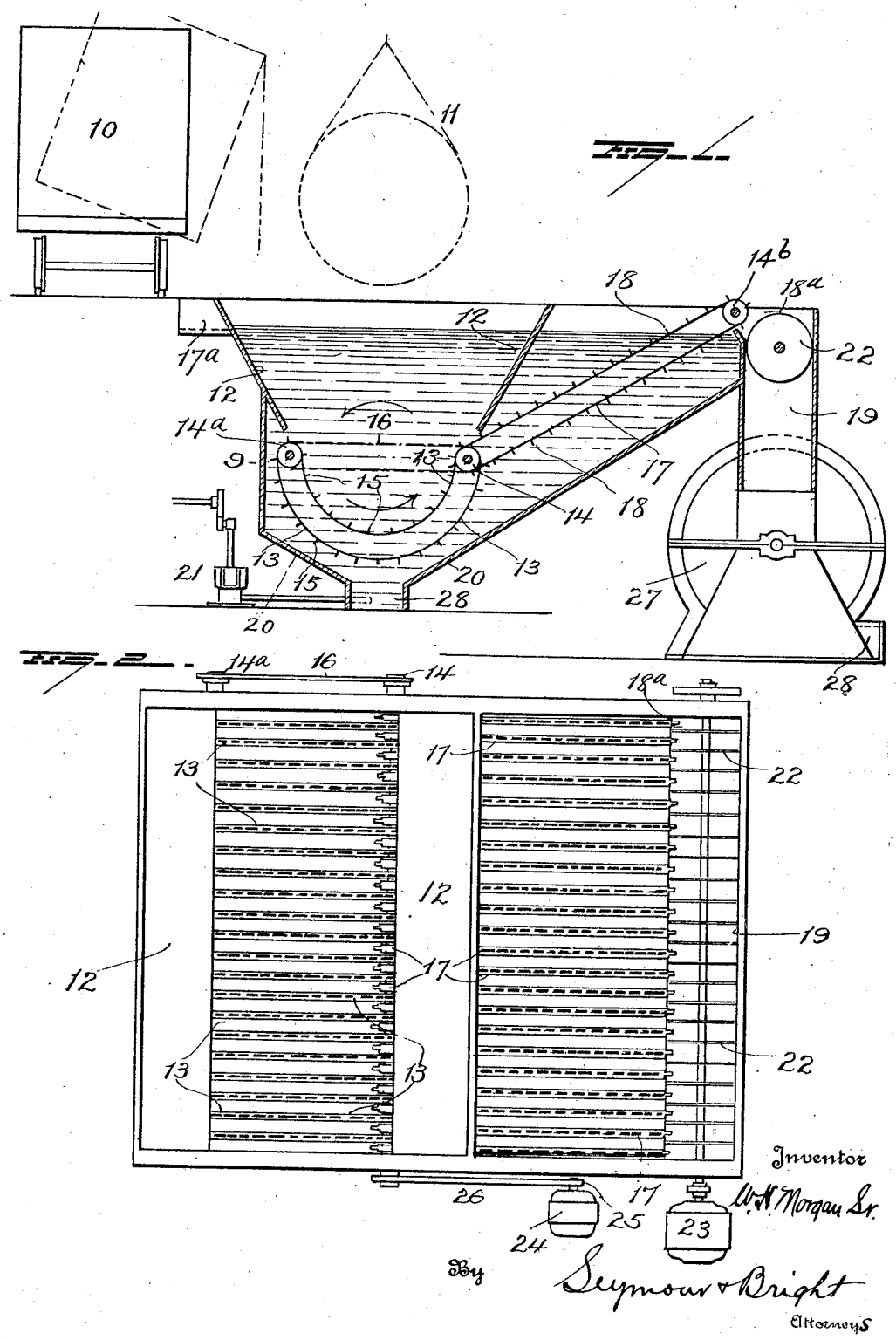

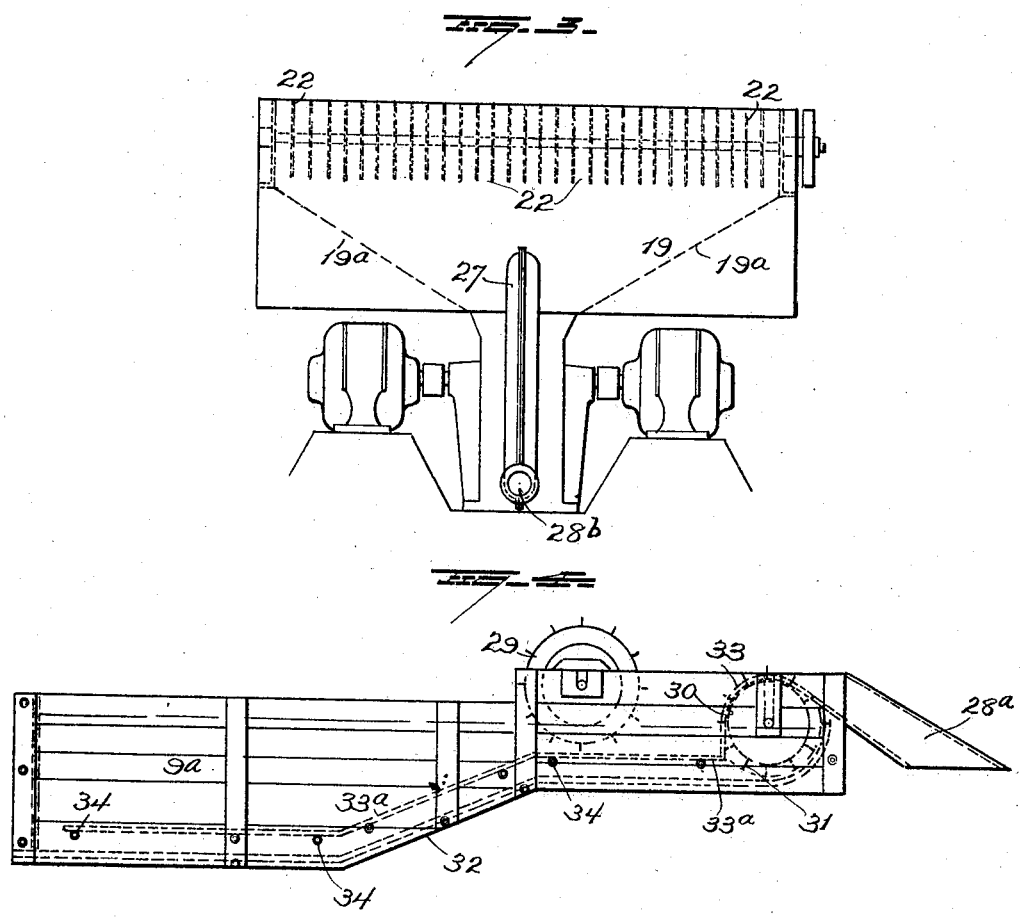

1,751,838

UNITED STATES PATENT OFFICE

WILLIAM HENRY MORGAN, SR., OF ALLIANCE, OHIO, ASSIGNOR, BY MESNE ASSIGNMENTS, TO THE MORGAN HURRYCANE COMPANY, OF NEW YORK, N. Y., A CORPORATION OF FLORIDA

APPARATUS FOR PREPARING CANE STALKS

Application filed August 19, 1925. Serial No. 51,092.

My invention relates to apparatus for preparing sugar cane stalks for the extraction of the juice therefrom.

The universal practice in extracting cane juice is to first crush the stalks and then pass the crushed stalks through a series of juice extracting rolls or units. The cane as it is fed to the crusher or pre-crusher is coated with a thin wax like substance and carries more or less dirt and other matter which contaminates the juice, and makes it necessary to purify it before it can be converted into sugar. Again parts of leaves and more or less trash pass with the stalks through the crushing and extracting rolls and assist in fouling the juice.

The principal object of the present invention is to provide an improved apparatus for washing or otherwise cleansing sugar cane stalks to remove all juice-contaminating matter therefrom and for separating the leaves and trash from the stalks.

With this and other objects in view the invention consists in the novel and improved features, constructions and combinations of parts hereinafter described and more particularly pointed out in the claims, the advantages of which will be readily understood and appreciated by those skilled in the art.

The invention will be clearly understood from the accompanying drawings illustrating the invention in its preferred form and the following detailed description of the construction shown therein.

In the accompanying drawings,

Figure 1 is a view in side elevation of one form of apparatus for carrying out my invention;

Figure 2 is a plan view of the same,

Figure 3 is a view in front elevation and

Figure 4 is a modified form.

In the construction shwn in Figures 1, 2 and 3, 9 represents a tank which may be located below the floor level as shown so that the contents of a cane car 10 can be dumped therein without handling or bundling the cane, or into which bundles of cane carried by a sling 11 from an overhead crane, may be readily deposited. The position of this tank however is not important except that if it be located on the floor instead of in a pit in the floor, the cane cannot be dumped directly into the same from a cane car as shown in Figure 1. The tank is provided with a hopper preferably having inclined ends 12 which direct the cane stalks onto the conveyor 13 preferably loop shaped and located adjacent the bottom of the hopper. This conveyor 13 consists preferably of a series of endless sprocket chains each of which is provided with a series of fingers 15 which positively move the cane stalks in the direction indicated by the arrows. The chains of the loop shaped conveyor 13 are mounted in loop form as shown and the two shafts 14 and 14$^a$ carrying and supporting same are connected by a drive belt or chain 16 shown in Figure 2 so that they rotate in unison and operate to maintain the conveyor in loop form, with the upper and lower runs of the conveyor in substantially parallel relations. The tank is filled with water or other cleansing fluid to a point near the top as indicated in Figure 1, an overflow spout 17$^a$ being provided for the free discharge of leaves and all trash, the specific gravity of which is less than water, the tank being kept filled with water supplied to replace the overflow.

One of the conveyor shafts, preferably the shaft 14, is positively driven by a motor, belt or other source of power, and the cane stalks as they are dumped into the hopper fall onto the loop conveyor and are rotated or moved in the direction indicated by the arrows. This immersion of the cane stalks in water, and the rumbling movement and attrition of the cane stalks while thus submerged, operate to remove the waxy substance covering the stalks and also all sand and dirt adhering to the stalks, and any tramp metal which might otherwise be carried into the machinery.

Leading upwardly from the conveyor 13 is an inclined conveyor 17 extending at its lower end about the shaft 14 and at its upper end about a shaft 14$^b$ located at the upper portion of the tank. This conveyor is supported by the shafts 14 and 14$^b$ in a position inclined upwardly from the conveyor 13 at an angle to the horizontal somewhat less than the adjacent side of the loop shaped conveyor 13 and is adapted to receive the stalks from the loop shaped conveyor and carry them upwardly to the top of the tank. The conveyor 17 is preferably submerged in the cleansing fluid in the hopper 9, except the upper end thereof and is so located as to receive the stalks carried around on the loop shaped conveyor and convey them up to the hopper 18ª located at the upper end of the chute 19. It will therefore be seen, that, the stalks, in addition to the washing and rumbling and attrition to which they are subjected while being carried around on the loop shaped conveyor, are also subjected to the cleansing action of the water or other fluid while on the inclined conveyor 17, so that by the time the stalks are discharged into the hopper 18ª they have been thoroughly washed and will be substantially free of dirt and other matter which would contaminate the juice.

The bottom 20 of the hopper 9 is inclined, and conducts the dirt, sand and other heavier impurities to a pocket or cistern 28 located at the base of the tank. This pocket is connected by a pipe with a pump 21 for removing all the dirt washed from the stalks.

The conveyors 13 and 17 are each preferably composed of series of parallel chains and the chains of the two conveyors are alternately arranged as shown in Figure 2.

The stalks as they are discharged from conveyor 17, fall onto the circular saws 22 which in the construction shown in Figures 1, 2 and 3 are located within hopper 18ª at the upper end of the chute 19. These saws are designed to cut the cleansed stalks into short sections approximately six inches in length, and are preferably driven by a motor 23.

The conveyor 17 and the loop conveyor 13 may be actuated by a motor 24 and belt or chain 26 connecting the shaft of the motor with the shaft 14. Both the conveyor 13 and the conveyor 17 are driven from the shaft 14 so that they are operated in unison and co-operate to rumble the stalks and convey the same to the top of the tank.

The cut sections of the stalks, as they leave the saws 22 fall by gravity down the chute 19, which latter, at its top, is the same length as the saw hopper 18ª. The bottom of chute 19 tapers as shown at 19ª in Figure 3, and guides the cut stalks to a disintegrator 27 of the type shown in my application Serial Number 12,410 filed February 28th, 1925. The cut stalks may however be fed by a conveyor to the ordinary pre-crusher and juice extracting rolls now universally used. In the operation of the disintegrator the disintegrated stalks are discharged through a discharge outlet 28ᵇ and may then be delivered to juice extracting rollers for the purpose of expressing the juice from the disintegrated mass. If the cleansing of the stalks be done by a washing and cleansing apparatus such as that shown in Figure 4, the stalks will be ejected from the washer and cleanser through the discharge spout 28ª onto a conveyor or other means for carrying it to a pre-crusher or to the disintegrator.

In the construction shown in Figure 4, either whole or cut stalks are dumped into the water tank 9ª, which is constructed with an opening and spout if desired at its front for the escape of leaves and all other trash the specific gravity of which is lighter than water. This tank is provided between its ends with a paddle wheel 29 which rotates in a direction to carry the stalks toward the elevating roll 30, which latter is provided with a series of radial fingers 31. The paddle wheel 29, and lifting roller 30 are partly submerged, and the paddle wheel 29 not only operates to create a circulation of water or other fluid in the tank, but also forces the cane toward the roller 30 and the cane is picked up by the lifting fingers and deposited in the discharge outlet 28ª. The circulation of the water toward the lifting roller would tend to carry the leaves and other trash toward the lifting roller, hence it may be necessary for a laborer standing at the side of the tank to remove the floating trash or propel it toward the trash escape outlet. The tank is preferably made deeper at its front end and its bottom is inclined upwardly between its ends as shown at 32 in Figure 4.

Partially surrounding the lifting roller 30 is a series of bars 33, which are separated sufficiently for the free movement of the lifting fingers between the bars but the bars are sufficiently close together to prevent the passage of stalks either whole or in sections between them. These bars terminate at one end, at the discharge outlet 28ª, and at the other, at the rear end of the diaphragm 33ª, and extend partially about the peripheral surface of the lifting roller. The diaphragm 33ª is located, above and preferably parallel with the bottom of the tank 9ª, and terminates a short distance from the front end of the tank. This diaphragm 33 rests on cross bolts or rods 34 which support the same in its proper position.

With this construction the fluid in the tank is kept in motion by the paddle 29, which carries the stalks, whole or cut into sections toward the lifting fingers 31 of the roller 30. These fingers pick up the stalks and deposit them in the discharge outlet through which they are conveyed to a disintegrator, or to a pre-crusher. The flow of fluid will be through the tank from the forward toward the rear end thereof above the diaphragm 33ª and back under the diaphragm to the front end thereof and then up to a point above the diaphragm at the forward end of the tank where the stalks are dumped into the tank.

It will therefore be seen that this apparatus may be used as a feeder for the pre-crusher and juice extracting rolls now in common use. If the disintegrator be used, the pre-crusher may be dispensed with and the disintegrated cane fed directly to juice extracting rollers.

The specific gravity of the cane is slightly greater than that of water. In the operation of the apparatus shown in Figures 1, 2 and 3 the tendency of the cane will be to form in a loose mass or bundle, in the looped conveyor. The bundle will be rotated by the looped conveyor thus causing the cane stalks to rub against one another which strips off adhering leaves or parts thereof and removes all foreign matter such as sand or dirt. The dirt and leaves adhering to the stalks are contaminated by bacteria from the fertilizer used and from the weeds and other vegetation in the fields, and if this passes into the juice stream, it will increase the tendency to inversion of the juice and the turning of the sucrose of the same into another form of sugar known as glucose. This latter material will not crystallize into marketable sugar, consequently is lost, or passes out as a by-product. By keeping the juice uncontaminated a greater quantity of sugar can be extracted therefrom.

Again the washing and attrition of the cane stalks, either whole or cut into sections, rids the stalks of all sand or grit which would otherwise be carried into the extracting rolls and result in an abrasive action on the rolls, which would eventually wear them smoother thus preventing the proper gripping action, as well as wearing out bearings, pump packing, and other parts.

With the construction shown in Figures 1, 2 and 3, it has been actually demonstrated that by disintegrating or shearing the cane, a uniform mat can be obtained which results in an increased capacity of the present mills. It was also found that the disintegrated or sheared cane absorbs the maceration water more readily than the ordinary crushed cane, owing probably to the fact that the wax covered water proof shell of the cane has been broken up thoroughly, exposing the pulpy part of the cane which readily absorbs the maceration water. This greatly increases the extraction of the sucrose.

It was also found that with the cane disintegrated or sheared as disclosed in connection with Figures 1, 2, and 3, smooth rolls can be used in the mills, as the smooth rolls grip the fibres and pull the fibrous mass through the rolls. At the present time it is necessary to use very rough cast iron shells on the rolls, which cause considerable trouble from breakage and wear and require frequent replacement. With this improvement solid polished steel rolls can be used with resulting long life and decrease of cost.

Instead of delivering the disintegrated cane discharged through the outlet 28$^b$ to juice extracting rolls, it may be delivered to any suitable means or apparatus for drying the shredded stalks.

Where a disintegrator, of any design, which will shear the cane into hay like formation is used, the resultant product is a spongy fibrous mass with the cane juice or sugar content therein. This spongy, hay like mass may be immediately conveyed to juice extracting means, or it may as above stated be dried, bundled and stored for future extraction of the juice. When bundled it may be shipped any distance to a sugar factory where the subsequent process of extracting the juice may be carried out. This has the advantage of permitting the milling of the cane to be done in small scattered plants, which need not have the facilities for extracting the juice. It also permits the storing up of the dried material should the capacity of the milling plant be in excess of the remainder of the factory. The dried material is comparatively light in weight owing to the fact that the moisture has been removed.

Shearing or disintegrating the stalks ruptures the cells, and while the water may be withdrawn by evaporation the sucrose will, as above stated, remain in the spongy mass. Again drying will kill the bacteria which cause inversion, and the baled products can be used throughout the year, thus permitting the use of much smaller sugar plants than those now used in extracting the juice under the present practice, where the cane is harvested and immediately subjected to juice extracting apparatus and evaporation. At the present time the entire crop must be harvested, evaporated, crystallized, etc., within five to six months, the mill being idle the balance of the year. With my apparatus I can rapidly or intensively harvest the cane thus taking advantage of the time when there is the greatest percentage of sucrose in the cane, and dry and evaporate it throughout the year, thus greatly decreasing the size and cost of the plant necessary to take care of the entire crop.

Again the dried material is about twenty (20) percent of the weight of freshly harvested cane, owing to the fact that the moisture or water has been removed, consequently it can be transported at a minimum of expense and without the loss of sucrose.

After the juice has been removed the bagasse is in perfect condition for burning and can be used in the furnaces as a fuel for supplying power and is also in condition for making artifical wood, plaster board and similar products.

Cane thus sheared and dried will yield more sucrose and less glucose, or in other words, more crystal sugar and less molasses.

In my apparatus it is not necessary to use filter presses or drying rolls as I extract the mud and other foreign material before it enters the juice thus eliminating the expense and losses above enumerated.

It is evident that many slight changes might be resorted to in the relative arrangement of parts shown and described without departing from the spirit and scope of my invention. Hence I would have it understood that I do not wish to confine myself to the exact construction and arrangement of parts shown and described but, Having fully described my invention what I claim as new and desire to secure by Letters Patent, is:—

1. An apparatus for preparing sugar cane stalks for the extraction of the juice therefrom, comprising in combination a tank for containing a cleansing liquid, a loop-shaped conveyor located in the tank and arranged to extend partially about a bundle or mass of stalks deposited therein for imparting a rotary or rumbling movement to said bundle or mass of stalks, a hopper having its side walls arranged to direct the stalks between the side portions of the loop shaped conveyor, and means arranged to receive the stalks from said conveyor for removing the stalks from the tank after they have been acted upon by said conveyor.

2. An apparatus for preparing sugar cane for the extraction of the juice therefrom comprising in combination a tank for holding a cleansing liquid, conveying means in said tank having a loop shaped portion arranged to extend partially about a bundle or mass of stalks deposited therein for rumbling the stalks in the liquid in the tank, and a portion leading from one of the sides of the loop shaped portion and extending upward at a less angle to the horizontal than the adjacent side of the loop shaped portion for removing the stalks from the tank.

3. An apparatus for preparing sugar cane stalks for the extraction of the juice therefrom comprising in combination a tank for holding a cleansing liquid, an endless loop shaped conveyor located in said tank so as to be completely immersed in the cleansing liquid and an inclined endless conveyor extending from one side of the loop shaped conveyor upwardly to the upper portion of the tank and inclined at a less angle to the horizontal than the adjacent side of the loop shaped conveyor for receiving the stalks from the loop shaped conveyor and removing the stalks from the tank.

In testimony whereof, I have signed this specification.

WILLIAM HENRY MORGAN, Sr.